Patented June 16, 1936

2,044,355

UNITED STATES PATENT OFFICE 2,044,355

PROCESS FOR PRODUCING POLYSUBSTITUTED DERIVATIVES OF UREA

Jerzy Kardaszewicz, Zagozdzon, Poland, assignor to Panstwowe Wytwórnie Prochu, Pionki, Poland No Drawing. Application January 12, 1933, Serial No. 651,359. In Poland January 28, 1932

3 Claims. (Cl. 260—125)

The present invention relates to a process for obtaining tetra-substituted derivatives of urea. In the first stage disubstituted chlorourea is obtained by the reaction of phosgene with a secondary amine, in the presence of an aqueous suspension of water insoluble substances such as zinc oxide, zinc dust, magnesium oxide, magnesium dust, or similar forms of iron or aluminum, the reaction being carried out at a temperature below 15° C., maintaining the suspension by intensive stirring and passing in a definite quantity of phosgene.

Said metallic elements or compounds thereof may be termed catalysts as they virtually serve as such in the reaction.

In the second stage the action of another molecule of a secondary amine on the disubstituted chlorourea at a temperature above 100° C. gives rise to a tetra-substituted derivative of urea.

During the course of the reaction, an increased pressure is employed in the reaction apparatus and the temperature is kept below 15° C.

The fundamental idea of the invention consists in applying such water insoluble substances as zinc oxide, zinc dust, magnesium oxide, metallic magnesium, in order to bind the hydrogen chloride generated during the reaction. At a temperature below 15° C., these insoluble substances do not positively react with phosgene, and their use renders it possible to obtain a yield amounting to 97–98% of the theoretic yield calculated on the basis of the quantities of phosgene and the secondary amine used.

Besides effecting the binding of the hydrogen chloride generated by the reaction, these substances have a catalytic effect on the course of the reaction.

The invention more particularly involves the production of dialkyldiarylureas by treating alkylarylamines such as ethylaniline with phosgene in the presence of an aqueous suspension of such substances as zinc oxide, zinc dust, magnesium oxide, metallic magnesium, etc., which do not react with phosgene but react with hydrogen chloride, giving rise to water soluble products.

The preferred catalysts are the elements magnesium and zinc or their oxides and said metals thus form a preferred group which we may term the magnesium and zinc group for the present purpose.

After passing in the whole quantity of phosgene, the contents of the reaction apparatus are transferred to a filter, the reaction producing a maximum yield at temperatures below 15° C. This reaction gives rise to ethylphenylchlorourea, which is first washed with dilute hydrochloric acid and then with water.

After washing, the ethylphenylchlorourea is dried at a temperature that is preferably not above the melting point, and is subsequently treated with a suitable quantity of the ethylaniline and zinc oxide, whereupon the whole mass is heated to a temperature of about 200° C. for a certain length of time and allowed to crystallize out. After crystallization, the diethyldiphenyl urea that has been obtained as the condensation product is first washed with dilute hydrochloric acid and then with water until all traces of HCl have disappeared, and is subjected to drying at a suitable temperature or, if required, to crystallization from any desired solvent.

*Example—Production of symmetrical diethyldiphenyl urea.*—100 gms. of ethylaniline are mixed with 150 ccs. of water containing 30 gms. of zinc oxide or 20 gms. of zinc dust.

After intimate mixture, 85 gms. of phosgene are introduced into the emulsion with constant stirring, the temperature being maintained constant at about 10° C.

The excess pressure prevailing in the reaction apparatus should amount to about 10 to 15 cms. of water column. After passing in the whole quantity of phosgene, the contents of the reaction apparatus are transferred to the filter, whereupon the precipitate is washed with 10% to 20% hydrochloric acid and then with water. After thorough washing, the ethyl-phenyl chlorourea obtained is dried at 40° C.

After the drying, the chloro-urea is dissolved in 150 gms. of ethylaniline, whereupon 15 gms. of zinc oxide are added, and the mass is heated up to 200° C. and allowed to crystallize out. After the mass has crystallized out at this temperature, the crystalline mass is transferred into a 10% solution of HCl having a temperature of 90° C. and, after washing thoroughly with hydrochloric acid, it is washed with hot water until all traces of HCl have disappeared, and then dried at 60° C.

The crude, symmetrical diethyl-diphenyl urea obtained in this manner has a melting point of about 72° C. and may be purified by recrystallization from alcohol.

Having now fully described my invention, I claim:

1. The method of producing tetrasubstituted derivatives of urea, which consists in first producing disubstituted chlorourea by bringing phosgene at a temperature below 15° C. into intimate contact with a secondary amine in the form of ethylaniline in the presence of an aqueous suspension of an oxide of an element of the magnesium and zinc group which is substantially inert at said temperature with respect to phosgene but capable of reacting with hydrogen chloride to produce water soluble products, and then producing the tetrasubstituted urea derivative from said disubstituted chlorourea by heating and condensing the same with another molecule of said secondary amine in the form of ethylaniline.

2. The method of producing tetrasubstituted derivatives of urea, which consists in first producing disubstituted chlorourea by bringing phosgene at a temperature below 15° C. into intimate contact with a secondary amine in the form of ethylaniline in the presence of an aqueous suspension of zinc oxide which is substantially inert with respect to phosgene at said temperature but capable of reacting with hydrogen chloride generated by this reaction to produce the water soluble zinc chloride, and then producing the tetrasubstituted urea derivative from said disubstituted chlorourea by heating and condensing the same with another molecule of said secondary amine in the form of ethylaniline.

3. The method of producing diethyldiphenylurea, which consists in mixing 100 parts of ethylaniline with an emulsion of 30 parts of zinc oxide in 150 parts of water, bringing 85 parts of gaseous phosgene into intimate contact with the resulting mixture during constant vigorous stirring thereof at a temperature of about 10° C., in order to cause a reaction, then transferring the product of said reaction to a filter and washing said product with diluted hydrochloric acid and with water so as to obtain washed ethylphenylurea, subsequently drying the ethylphenylurea at a temperature ranging from about 35° to about 40° C., further treating said ethylphenylurea with 150 parts of ethylaniline and 15 parts of zinc oxide and also heating the mixture to about 200° C. and causing a second reaction thereafter allowing the product of this second reaction to cool and washing said product with hot 10% hydrochloric acid and also with water until all traces of chlorine are absent in order to obtain fully washed diethyldiphenylurea, and finally drying the latter at about 60° C. to obtain dried diethyldiphenylurea having a melting point of about 72° C. and capable of being recrystallized from suitable solvents.

JERZY KARDASZEWICZ.